US009734523B2

(12) United States Patent
Ooi et al.

(10) Patent No.: US 9,734,523 B2
(45) Date of Patent: Aug. 15, 2017

(54) VIRTUAL STAND-IN COMPUTING SERVICE FOR PRODUCTION COMPUTING SERVICE

(71) Applicant: CA, Inc., New Yorik, NY (US)

(72) Inventors: Victor Ooi, Victoria (AU); Steven Cornelis Versteeg, Hawthorn (AU); Robert Williams, Howe, TX (US)

(73) Assignee: CA, INC., Islandia, NY (US)

( * ) Notice: Subject to any disclaimer, the term of this patent is extended or adjusted under 35 U.S.C. 154(b) by 20 days.

(21) Appl. No.: 14/662,274

(22) Filed: Mar. 19, 2015

(65) Prior Publication Data

US 2015/0195352 A1    Jul. 9, 2015

Related U.S. Application Data

(62) Division of application No. 14/103,567, filed on Dec. 11, 2013, now Pat. No. 9,141,979.

(51) Int. Cl.

| G06Q 30/00 | (2012.01) |
|---|---|
| H04M 15/00 | (2006.01) |
| G06Q 30/04 | (2012.01) |
| H04L 29/08 | (2006.01) |
| G06F 9/00 | (2006.01) |
| G06F 11/00 | (2006.01) |
| H04L 12/24 | (2006.01) |
| H04L 29/14 | (2006.01) |
| G06Q 10/08 | (2012.01) |

(52) U.S. Cl.
CPC ............... *G06Q 30/04* (2013.01); *G06F 9/00* (2013.01); *G06F 11/00* (2013.01); *H04L 41/00* (2013.01); *H04L 67/10* (2013.01); *H04L 67/1034* (2013.01); *H04L 67/1095* (2013.01); *H04L 69/40* (2013.01); *G06Q 10/08* (2013.01)

(58) Field of Classification Search
CPC ...... G06Q 30/04; G06Q 20/102; G06F 11/00; G06F 21/00; G06F 9/44; H04L 29/08
USPC ............... 705/34; 726/4; 714/47.3; 717/135; 709/203
See application file for complete search history.

(56) References Cited

U.S. PATENT DOCUMENTS 8,990,639 B1 *    3/2015    Marr ........................ G06F 11/30
                                                                714/25
2004/0220792 A1    11/2004    Gallanis et al.
2005/0246207 A1    11/2005    Noonan et al.
2005/0256952 A1 *  11/2005    Mouhanna .......... H04L 41/0803
                                                                709/223

(Continued)

*Primary Examiner* — Seye Iwarere
(74) *Attorney, Agent, or Firm* — Sage Patent Group

(57) ABSTRACT

Provided are methods of providing a virtual service that may provide partial real time service to clients of a production computing service that is unavailable. Methods may include generating, based on transaction data corresponding to a production computing service that is available, a production computing service model that includes multiple request types and multiple confidence values that correspond to ones of the request types. Methods may include responding to a request received from a client of the production computing service with a model-generated response to the request in response to the production computing service being unavailable. The production computing service is updated with the request received from the client and the model-generated response responsive to the production computing service being available after being unavailable.

15 Claims, 9 Drawing Sheets

(56) References Cited

U.S. PATENT DOCUMENTS

| | | | |
|---|---|---|---|
| 2006/0106920 A1* | 5/2006 | Steeb | G06F 9/5005 709/220 |
| 2008/0172720 A1 | 7/2008 | Botz et al. | |
| 2010/0306827 A1* | 12/2010 | Esteve Balducci | H04L 63/105 726/4 |
| 2011/0004565 A1* | 1/2011 | Stephenson | G06Q 10/06 705/348 |
| 2011/0137745 A1* | 6/2011 | Goad | G06F 17/3087 705/26.9 |
| 2011/0243553 A1* | 10/2011 | Russell | G06Q 30/0631 398/25 |
| 2012/0204032 A1* | 8/2012 | Wilkins | H04L 9/006 713/170 |
| 2013/0123950 A1 | 5/2013 | Monroe | |
| 2013/0152209 A1* | 6/2013 | Baumann | G06F 21/53 726/26 |
| 2013/0185729 A1 | 7/2013 | Vasic et al. | |
| 2013/0262390 A1* | 10/2013 | Kumarasamy | H04L 41/08 707/649 |
| 2014/0046638 A1* | 2/2014 | Peloski | G06F 17/5009 703/6 |
| 2014/0143207 A1 | 5/2014 | Brewer et al. | |
| 2014/0223418 A1* | 8/2014 | Michelsen | G06F 11/3696 717/135 |
| 2014/0229610 A1* | 8/2014 | Shen | H04L 67/1031 709/224 |
| 2014/0297234 A1 | 10/2014 | Garzon et al. | |
| 2015/0142748 A1* | 5/2015 | Gottemukkula | G06F 11/1451 707/649 |
| 2015/0199212 A1* | 7/2015 | Acheff et al. | G06F 11/36 719/317 |
| 2015/0205703 A1* | 7/2015 | Michelsen | G06F 11/3688 717/135 |
| 2016/0055556 A1* | 2/2016 | Ignatius | G06Q 30/0609 705/26.35 |

* cited by examiner

VIRTUAL STAND-IN COMPUTING SERVICE FOR PRODUCTION COMPUTING SERVICE

CROSS-REFERENCE TO RELATED APPLICATIONS

The present application is a divisional of U.S. patent application Ser. No. 14/103,567, filed Dec. 11, 2013, assigned to the assignee of the present application, the disclosure and content of which is incorporated by reference herein in its entirety.

BACKGROUND

Outages and downtime in production computing services and/or systems may be undesirable to the providers and/or the clients of such services. Parallel production computing services that include substantially all of the functionality of their counterparts may incur significant expenses. For example, the cost of a production computing service may be double based on providing complete redundancy. Additionally, systems that provide hot backup for a production computing service may be beyond the control of clients that rely on the production computing services.

BRIEF SUMMARY

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present inventive concept, and be protected by the accompanying claims.

Some embodiments are directed to systems, methods and computer program products for generating a production computing service model. In some embodiments, operations may include receiving, by an active virtual service, transaction data corresponding to a production computing service, generating, based on the transaction data, a production computing service model that includes multiple request types and confidence data that correspond to ones of the request types. The production computing service model may be updated based on additional transaction data corresponding to the production computing service.

In some embodiments, receiving the transaction data includes receiving a request from a client of the production computing service and transmitting the request to the production computing service and receiving a response to the request from the production computing service and transmitting the response to the request to the client. Some embodiments provide that generating the production computing service model includes sending the request to a transaction library, sending the response to the request to the transaction library and associating the request and the response to the request in the transaction library.

In some embodiments, generating the production computing service model includes associating the request and the response in a transaction library and generating a model response to the request based on transaction library data. Some embodiments include comparing the response to the request from the production computing service with the model response to generate an accuracy of the model response and updating the production computing service model responsive to results of the comparing operation.

Some embodiments include generating historical accuracy values corresponding to the request types. Some embodiments provide that updating the production computing service model includes updating the historical accuracy values.

Some embodiments are directed to systems, methods and computer program products providing a virtual stand-in computing service for a production computing service. Operations corresponding to some embodiments include generating, based on transaction data corresponding to a production computing service that is available, a production computing service model that includes multiple request types and multiple confidence values that correspond to ones of the request types, responding to a request received from a client of the production computing service with a model-generated response to the request in response to the production computing service being unavailable, and updating the production computing service with the request received from the client and the model-generated response responsive to the production computing service being available after being unavailable.

In some embodiments, the transaction data includes requests from clients for service from the production computing service and corresponding responses provided by the production computing service. Some embodiments provide that generating the production computing service model includes populating a transaction library with the requests, the corresponding responses and confidence values corresponding to specific request types.

In some embodiments, responding to the request received from the client of the production computing service with the model-generated response includes generating an initial model-generated response corresponding to the request and based on data in the transaction library, estimating accuracy data corresponding to the response based on a corresponding request type of request types and historical accuracy data of the corresponding request type and comparing the accuracy data to confidence threshold data. In some embodiments, the model-generated response includes the initial model-generated response in response to the accuracy data being equal to or greater than the confidence threshold data, and the model-generated response includes an error message in response to the initial model-generated response being less than the confidence threshold data.

In some embodiments, the confidence threshold data includes a confidence threshold value that corresponds to a request type. Some embodiments provide that responding to the request received from the client of the production computing service with the model-generated response includes updating an offline transaction log that is configured to maintain a record of transaction data when the production computing service is unavailable and when the model-generated response includes an initial model-generated response. In some embodiments, the record of transaction data includes the request received and the model-generated response.

Some embodiments provide that the confidence threshold data is configurable and is a function of at least one of an elapsed time since the production computing service is offline, a value of a service or good corresponding to the request, and whether the request causes a read operation or a write operation.

In some embodiments, updating the production computing service with the request received from the client and the model-generated response responsive to the production computing service being available after being unavailable includes sending the request that was made while the production computing service was unavailable to the production computing service, receiving, from the production computing service, a response to the request that was received while the production computing service was unavailable, and comparing the response received by the production computing service to the model-generated response to determine a difference therebetween.

Some embodiments include performing a corrective action responsive to the model-generated response being different from the response received by the production computing service. In some embodiments, the corrective action includes notifying the client of the difference in response or updating a transaction library that includes the transaction data.

In some embodiments, generating the production computing service model includes storing the transaction data in a transaction library and updating the production computing service model by storing subsequently received transaction data and estimating updated confidence values. Some embodiments provide that generating the production computing service model includes operating in a first operating mode, responding to the request received from the client with the model-generated response includes operating in a second operating mode, and updating the production computing service with the request received from the client and the model-generated response includes operating in a third operating mode. Some embodiments provide that the first operating mode corresponds to the production computing service being available, the second operating mode corresponds to the production computing service being unavailable and the third operating mode corresponds to the production computing service being available after being unavailable.

Some embodiments of the present disclosure are directed to computer program products that include a computer readable storage medium having computer readable program code embodied in the medium. The computer code may include computer readable code to perform operations as described herein.

Some embodiments of the present disclosure are directed to a computer system that includes at least one processor and at least one memory coupled to the processor. The at least one memory may include computer readable program code embodied therein that, when executed by the at least one processor causes the at least one processor to perform operations as described herein.

It is noted that aspects of the disclosure described with respect to one embodiment, may be incorporated in a different embodiment although not specifically described relative thereto. That is, all embodiments and/or features of any embodiment can be combined in any way and/or combination. These and other objects and/or aspects of the present inventive concept are explained in detail in the specification set forth below.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
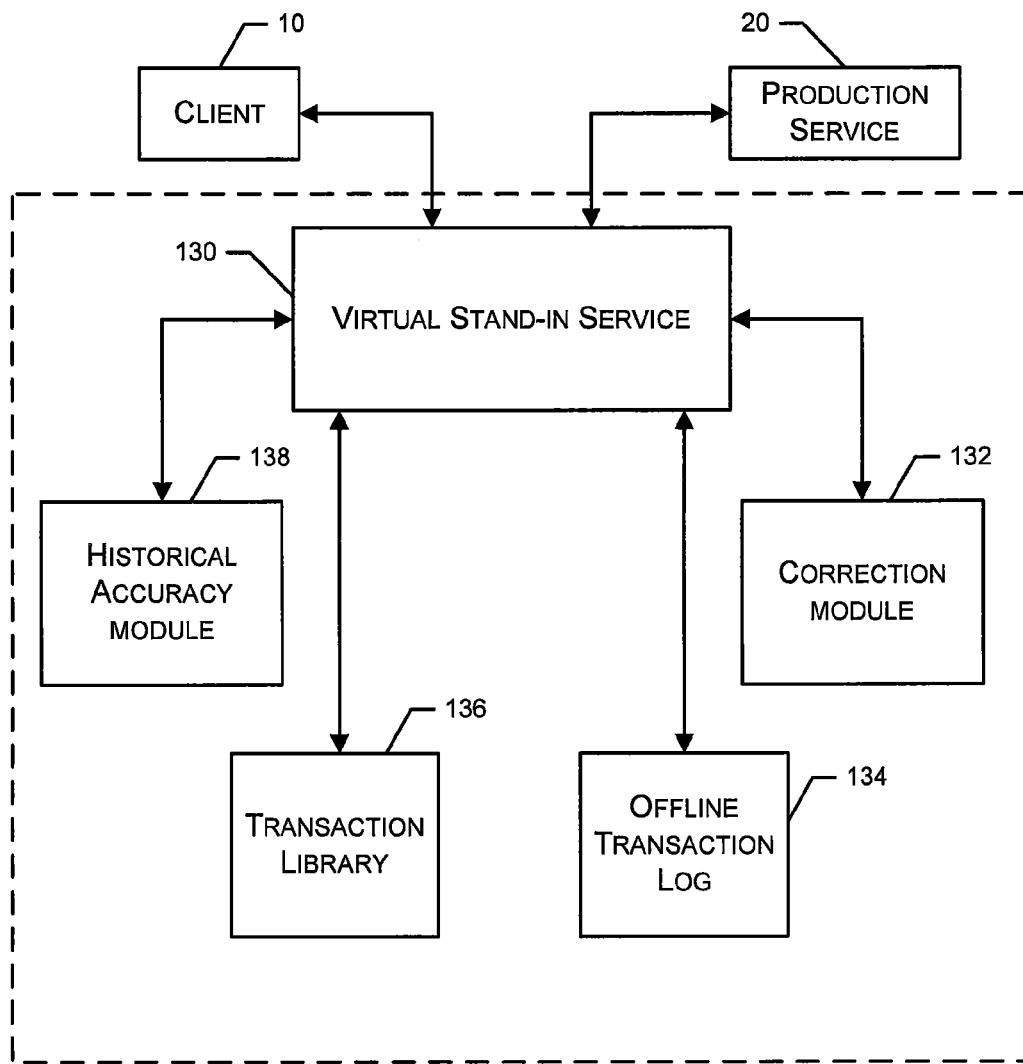
FIG. 1 is a block diagram of a computing system for a virtual stand-in computing service according to some embodiments of the present inventive subject matter.

As discussed herein, a virtual stand-in computing service may seamlessly provide services during an outage of a production computing service. Systems, methods and computer program products described herein may activate a virtual stand-in computing service when a corresponding production computing service experiences an outage. The virtual stand-in computing service may be operable to determine which operations it is competent to perform and which operations it is not competent to perform. In some embodiments, the virtual stand-in computing service may flag operations for which its competence is questionable. For example, in the context of an airline booking system, the production computing service may be down and a client may request to book a ticket. The virtual stand-in computing service may send back an answer to the client that the booking operation is unavailable at that time to avoid overbooking. Some embodiments provide that the virtual stand-in computing service may book the flight with an identification that there is a risk of overbooking. Other operations, such as search queries, may be performed by the virtual system without risk. Some embodiments provide that non-write queries and conditional write queries may be performed by the virtual system with very low risk.

In some embodiments, the virtual stand-in computing service and the production computing service may run in parallel so that the virtual stand-in computing service is able to adaptively learn the behavior of the production computing service and maintain a level of data and/or information parity with the production computing service. Some embodiments provide that the virtual stand-in computing service may generate and maintain an accurate and detailed model that the virtual stand-in computing service may rely on when activated.

In some embodiments, a transaction log may keep a record of all transactions that are handled by the virtual stand-in computing service and then reconcile the production computing service with the activity that occurred while the production computing service was out. Some embodiments provide that the virtual stand-in computing service may include an awareness regarding which operations it is competent to perform and/or which requests and/or request types may be served.

In some embodiments, the virtual stand-in computing service may include a transaction library of request/response pairs. When the virtual stand-in computing service receives a request, that request may be matched to previously made requests in the transaction library to find the most similar request and/or the request that has the same signature. The corresponding response to the request may then be sent back. Some embodiments provide that the transaction library may be organized hierarchically, by conversation state, to enable only a subset of the recorded transactions, corresponding to the current conversation state, to be searched for the most similar request. In some embodiments, when sending back the response, the virtual stand-in computing service may know which fields are to be substituted in order to form a valid response. (For example the message id and/or the user name of the response may need to be substituted to match those of the request.) Some embodiments provide that in a large portion of requests, the virtual stand-in computing service may answer competently, however, for a small number of requests the virtual stand-in computing service may not be competent to respond. Some embodiments provide that the level of competence may depend on the tolerance of the customer and/or the type of request, among others. In the airline booking system example, actually booking flights that may have some risk of being overbooked may be preferable to missing the bookings. Once the production computing service comes back on-line, the activities performed by the virtual stand-in computing service may be evaluated by the production computing service.

Some embodiments provide that example uses of a virtual stand-in computing service may include transit schedules, transit booking systems and other generally stable systems that may be interrogated. In some embodiments, a virtual stand-in computing service may be used by a development team for testing a production computing service and may be used as a back-up to the production computing service once deployed. Additionally, a virtual stand-in computing service may be used for a banking service, since everything may typically be reconciled at the end of the day. In some embodiments, for example, users may withdraw a certain amount via the virtual stand-in computing service even though the production computing service is offline with the risk that the account may be overdrawn by a certain amount. Varying levels of risk may be associated with different client identifiers, transaction types, and/or transaction amounts, among others.

Reference is now made to FIG. 1, which is a block diagram of a computing system for a virtual stand-in computing service according to some embodiments of the present inventive subject matter. Some embodiments provide that a virtual stand-in computing service 130 may receive a request from a client 10 that is seeking a service from a production computing service 20. The virtual stand-in computing service 130 may forward the request from the client 10 to the production computing service 20. The production computing service 20 may send a response to the request back to the virtual stand-in computing service 130, which may be sent to the client 10. Additionally, the virtual stand-in computing service 130 may send the request from the client 10 to a transaction library 136. The transaction library 136 may generate a model-generated response which may be compared with the production response generated by the production computing service 20. The transaction library 136 may be updated with the results of the comparison so that a model of the production computing service 20 may be adapted. Some embodiments provide that a historical accuracy module 138 may receive and maintain accuracy information corresponding to different requests and/or request types. Statistics corresponding to the accuracy of the generated responses to actual requests and/or request types may be generated and updated as additional accuracy data is received.

The virtual stand-in computing service 130 may continue to receive requests from clients 10 when the production computing service 20 becomes unavailable. For example, the production computing service 20 may become unavailable because it is off-line, nonfunctional and/or nonresponsive to requests from clients 10. In some embodiments, the virtual stand-in computing service 130 may determine that the production computing service 20 is unavailable based on receipt of an error message from the production computing service 20, a lack of response from the production computing service 20 and/or a significantly delayed response from the production computing service 20. In some embodiments, the production computing service 20 may notify the virtual stand-in computing service 130 in advance of known and/or planned periods of unavailability.

Upon receipt of a request from a client 10 when the production computing service 20 is unavailable, the virtual stand-in computing service 130 may send a request to the transaction library 136 and receive a model-generated response therefrom. The virtual stand-in computing service 130 may use the historical accuracy module 138 to determine the model-generated response accuracy, which may be received as confidence data. Some embodiments provide that the confidence data may include a confidence value such as, for example, a numerical value and/or a confidence classification, such as, for example, "High", "Medium" or "Low", among others.

The virtual stand-in computing service 130 may compare the confidence data to a confidence threshold to determine whether to send the model-generated response to the client 10 or to send an error message to the client 10. In the event the confidence data satisfies the confidence threshold, the virtual stand-in computing service 130 may update and offline transaction log 134. In some embodiments, the offline transaction log 134 may maintain relevant data corresponding to requests from clients 10 that were served by model-generated responses via the virtual stand-in computing service 130. Relevant data may include the request content, request type, requesting client information, request time and date, and/or the model-generated response, among others. In this matter, accurate record of transactions (e.g., requests/responses) during the period of production computing service unavailability may be preserved.

In some embodiments, the confidence threshold may be specific to the request type. For example, requests corresponding to low risk, low liability and/or non-critical operations may have lower confidence thresholds than requests corresponding to high risk, high liability and/or critical operations. Some embodiments provide that a confidence threshold may be a function of one or more variables within a request type. For example, if the request type corresponds to a monetary transaction having a value of less than a specific amount, the confidence threshold may be lower than the request type for a monetary transaction having a value greater than the specific amount.

In some embodiments, the confidence threshold may be a function of elapsed time since the production computing service became unavailable. For example, a request for more time sensitive information may be associated with a confidence threshold that increases as a function of time so that responses must have increasingly higher confidence data to meet the confidence threshold, and thus be sent to the client 10. For example, some embodiments provide that the confidence threshold may be determined algorithmically and may use one or more input variables. In this manner, the virtual stand-in computing service 130 may be able to determine which requests it is capable of responding to during production computing service unavailability.

Once the production computing service 20 becomes available again, the virtual stand-in computing service 130 may begin reconciliation operations corresponding to activity that occurred during the period of unavailability. For example, in the context of a request/response pair the virtual stand-in computing service 130 may read the off-line transaction data from the offline transaction log 134 and send the previously received request to the production computing service 20 and receive a production computing service response corresponding to the request. The virtual stand-in computing service 130 may determine if there is a difference between the production computing service response and the model-generated response that was sent to the client 10. If the model-generated response is different from the production computing service response then a correction module 132 may determine and/or perform a corrective action. Corrective actions may include notifying the client 10 of any difference between the model-generated response in the production computing service response, including provided corrected information and/or service. Corrective action may also include updating the transaction library 136 to maintain the correct response to that request and/or request type. Additionally, the historical accuracy module 138 may be updated to confidence data corresponding to that request and/or request type.

Although the virtual stand-in computing service 130 is illustrated as a separate component from the correction module 132, off-line transaction log 134, the transaction library 136 and the historical accuracy module 138, the one or more of these components, modules and/or services may be provided in a single component, module and/or service or in any combination thereof.

Figure 2:
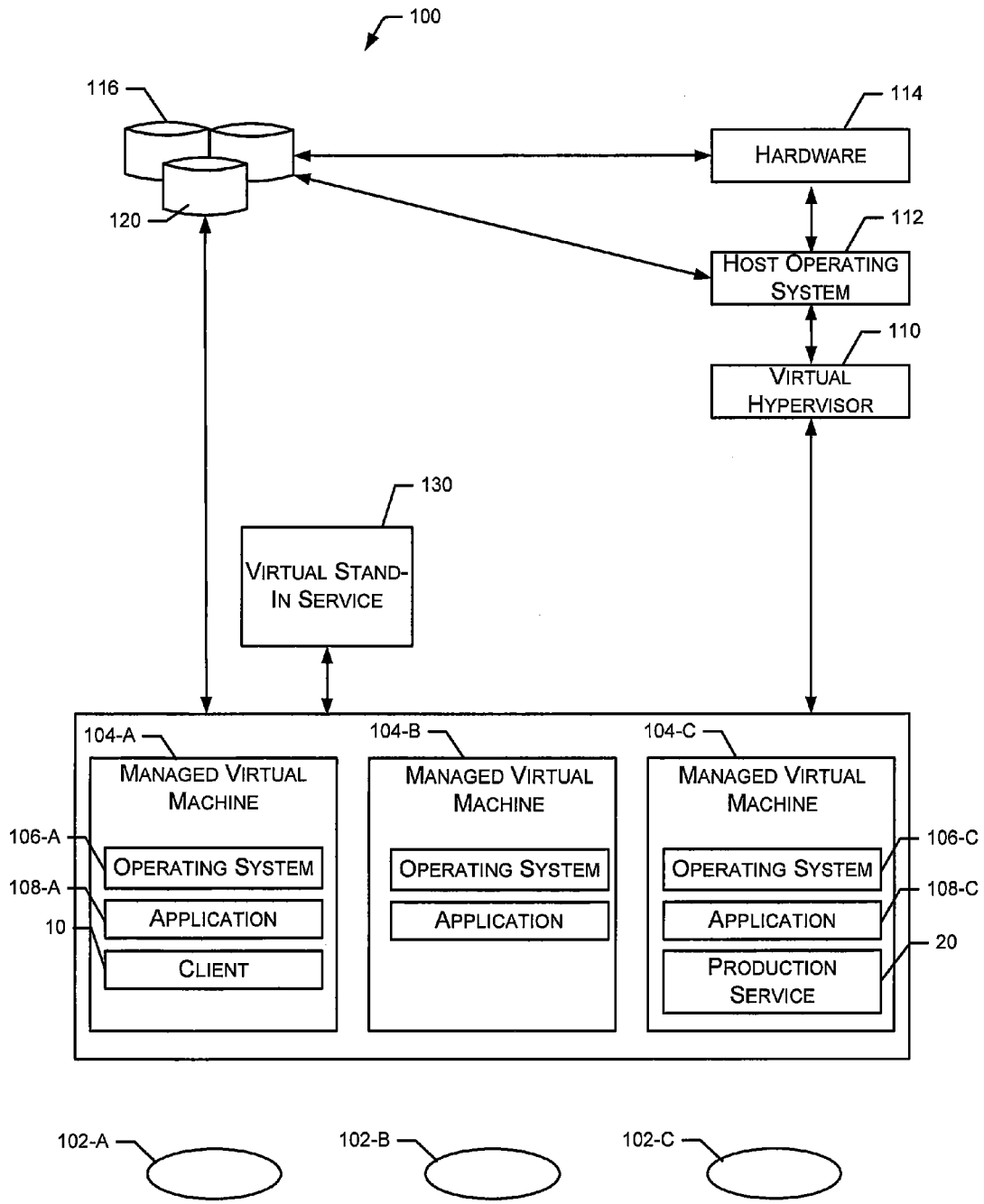
FIG. 2 illustrates a virtual computing environment according to some embodiments of the present inventive subject matter.

Reference is now made to FIG. 2, which illustrates a virtual computing environment according to some embodiments of the present inventive subject matter. The computer system 100 generally hosts and manages one or more virtual machines 104 (hereafter managed virtual machine, or managed machine), each of which runs a guest operating system 106 and application 108. The computing needs of users 102 (e.g., humans and/or other virtual/non-virtual machines) drive the functionality of the virtual machines 104. A virtual hypervisor 110 can provide an interface between the virtual machines 104 and a host operating system 112 and allow multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computer system capable of implementing virtual machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), including, but not limited to the AMD Athlon™ 64, or Intel® Core™ Duo, among others.

The hardware platform 114 may be further connected to the data storage space 116 through serial or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) may run on the host operating system 112 and may provide an interface between the virtual machine 104 and the hardware platform 114 through the host operating system 112. The virtual hypervisor 110 virtualizes the computer system resources and facilitates the operation of the virtual machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the virtual machines 104 present a virtualized environment to the guest operating systems 106, which in turn provide an operating environment for applications 108 and other software constructs.

Applications 108 that are implemented on the virtual machines 104 may be configured to access one or more data sources in accordance with the functions thereof. As discussed herein by way of example, a data source may be a file, however, the disclosure is not so limited. For example, database applications and/or applications that operate, at least in part, using data sources such as database files, may rely on access to one or more database files to perform the requisite operations. In some embodiments, such access may further include one or more settings that determine or identify a portion, format, location, path, version or other attribute of the file being accessed. For example, an access request corresponding to a database file may include query terms, among others. In some embodiments, an access request corresponding to a database file may be directed to a database 120 that may be included in or provided in addition to the data storage space 116.

In some embodiments, one or more managed virtual machines may include one or more applications that provide a production computing service 20 that may fulfill a requests from a client 10. As discussed above regarding FIG. 1, client requests may be sent to and/or through a virtual stand-in computing service 130 that may generate a model production computing service for providing model-generated responses to client requests during periods in which the production computing service is unavailable.

Figure 3:
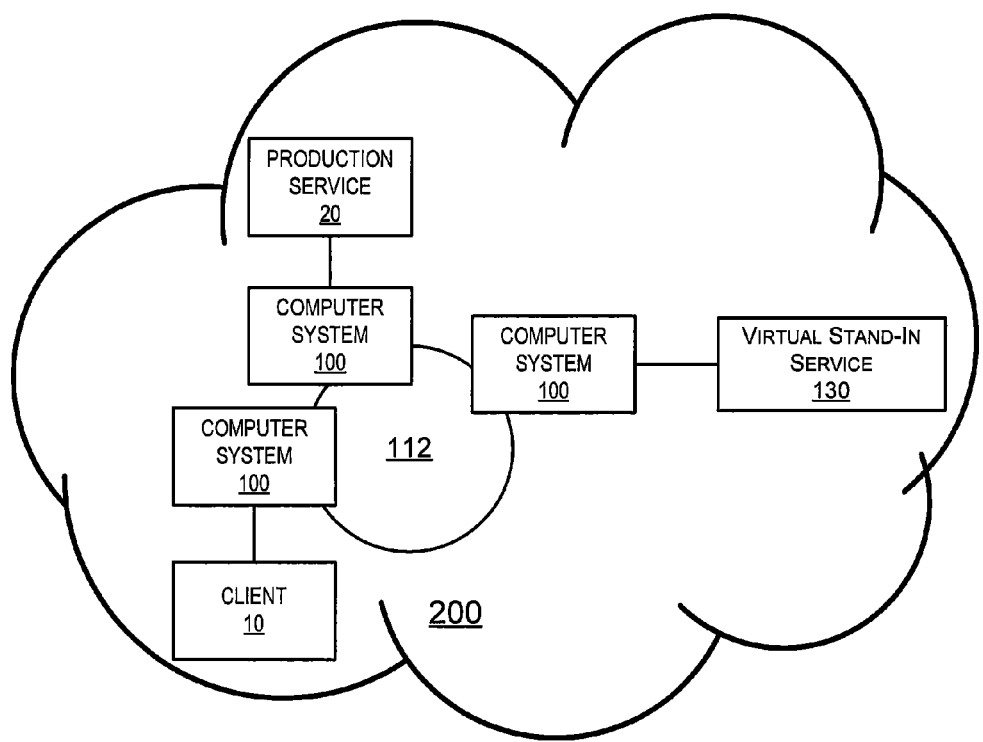
FIG. 3 illustrates a virtual computing environment according to some embodiments of the present inventive subject matter.

Reference is now made to FIG. 3, which illustrates a virtual computing environment according to some embodiments of the present inventive subject matter. A virtual computing environment 200 (referred to generally as cloud 200) may include one or more computer systems 100 (referred to as server systems) that may include one or more electronic computing devices operable to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The plurality of server systems 100 may be communicatively coupled via a network 112. The network 112 facilitates wireless and/or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. Although referred to herein as "server systems", it will be appreciated that any suitable computing device may be used. A network address may include an alphabetic and/or numerical label assigned to a device in a network. For example, a network address may include an IP address, an IPX address, a network layer address, a MAC address, an X.25/X.21 address, and/or a mount point in a distributed file system, among others.

While FIG. 3 illustrates a physical configuration of servers within a cloud 200, a computer system 100 may include a logical grouping of virtual machines 104 within a virtualization environment in the cloud 200. Although not illustrated herein, the virtual machines 104 in the cloud can be organized and managed in clusters, which may also referred to herein as "grids". A virtualization environment in the cloud 200 may be managed by a single hypervisor 110, or a set of hypervisors 110.

Virtual machines can be deployed in particular virtualization environments and organized to increase the efficiency of operating and/or managing a virtual computing environment. For example, virtual machines may be grouped into clusters in order to provide load balancing across multiple servers.

In some embodiments, one or more computer systems 100 may include one or more applications that provide a production computing service 20 that may fulfill a requests from a client 10. As discussed above regarding FIG. 1, client requests may be sent to and/or through a virtual stand-in computing service 130 that may generate a model production computing service for providing model-generated responses to client requests during periods in which the production computing service is unavailable. Some embodiments provide that the virtual stand-in computing service 130, the client 10 and/or the production computing service 20 may be separate from the computer systems 100 or may be partially within one or more of the computer systems 100.

Server automation/provisioning tools (also referred to as server deployment tools) may be used to manage virtual machines in a cloud computing environment. For example, server automation/provisioning tools may move virtual machines from one hypervisor to another or from one virtualization environment to the other. These tools may also be used, for example, to deploy, provision, activate, suspend, and otherwise manage the operation of virtual machines. These tools may further be used to implement systems/methods according to some embodiments described herein.

Figure 4:
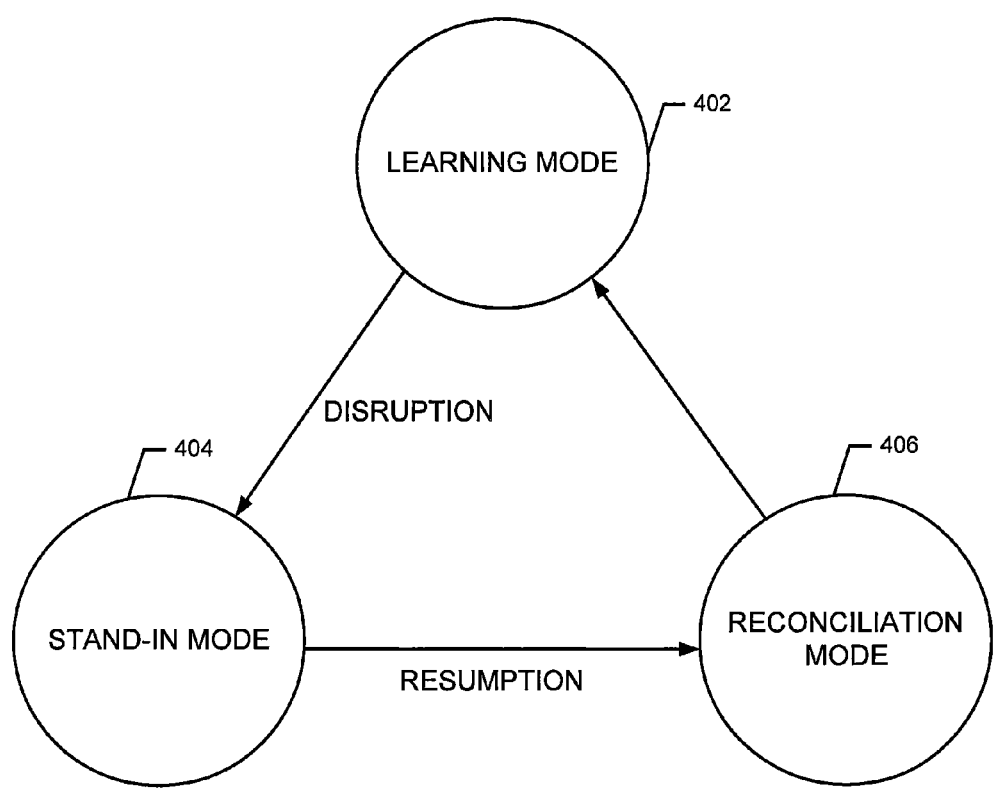
FIG. 4 is a flowchart illustrating operating modes of a virtual stand-in computing service according some embodiments of the present inventive subject matter.

Brief reference is now made to FIG. 4, which is a flowchart illustrating operating modes of a virtual stand-in computing service according some embodiments of the present inventive subject matter. As discussed above regarding FIG. 1, systems methods and computer program products corresponding to some embodiments of the virtual stand-in computing service disclosed herein may function in three operating modes, namely, learning mode 402, stand-in mode 404, and reconciliation mode 406. The virtual stand-in computing service 130 may operate in the learning mode 402 when the production computing service 20 is available to receive and process client requests. In this manner, the virtual stand-in computing service 130 may operate in parallel with the production computing service 20.

In the event of a disruption that renders the production computing service 20 unavailable, the virtual stand-in computing service 130 may operate in the stand-in mode 404. While operating in the stand-in mode 404, the virtual stand-in computing service 130 may respond to client requests with either model-generated responses or error messages, depending on the confidence data and confidence threshold corresponding to the request and/or request type. During the stand-in mode 404, the virtual stand-in computing service 130 may maintain an offline transaction log of each request and model-generated response.

Once the production computing service 20 resumes to becomes available after being unavailable the virtual stand-in computing service 130 may operate in a reconciliation mode 406. In some embodiments, the virtual stand-in computing service 130 may operate in the reconciliation mode 406 until all of the transactions (requests/responses) that are in the off-line transaction log 134 have been processed by the production computing service 20. Some embodiments provide that any requests received during reconciliation mode may continue to be processed by the virtual stand-in computing service 130 as if the production computing service 20 is unavailable. In some embodiments, the production computing service 20 may begin responding to requests after the reconciliation mode has started but before reconciliation is complete. For example, the production computing service 20 may begin responding to requests when a specified amount and or percentage of the transactions in the off-line transaction log 134 have been processed and/or remain to be processed. Some embodiments provide that the production computing service 20 may delay responding to requests by given time interval. Once all the transactions in the off-line transaction log 134 have been processed by the production computing service 20 in the virtual stand-in computing service 130, the virtual stand-in computing service 130 may operate in learning mode 402.

Figure 5:
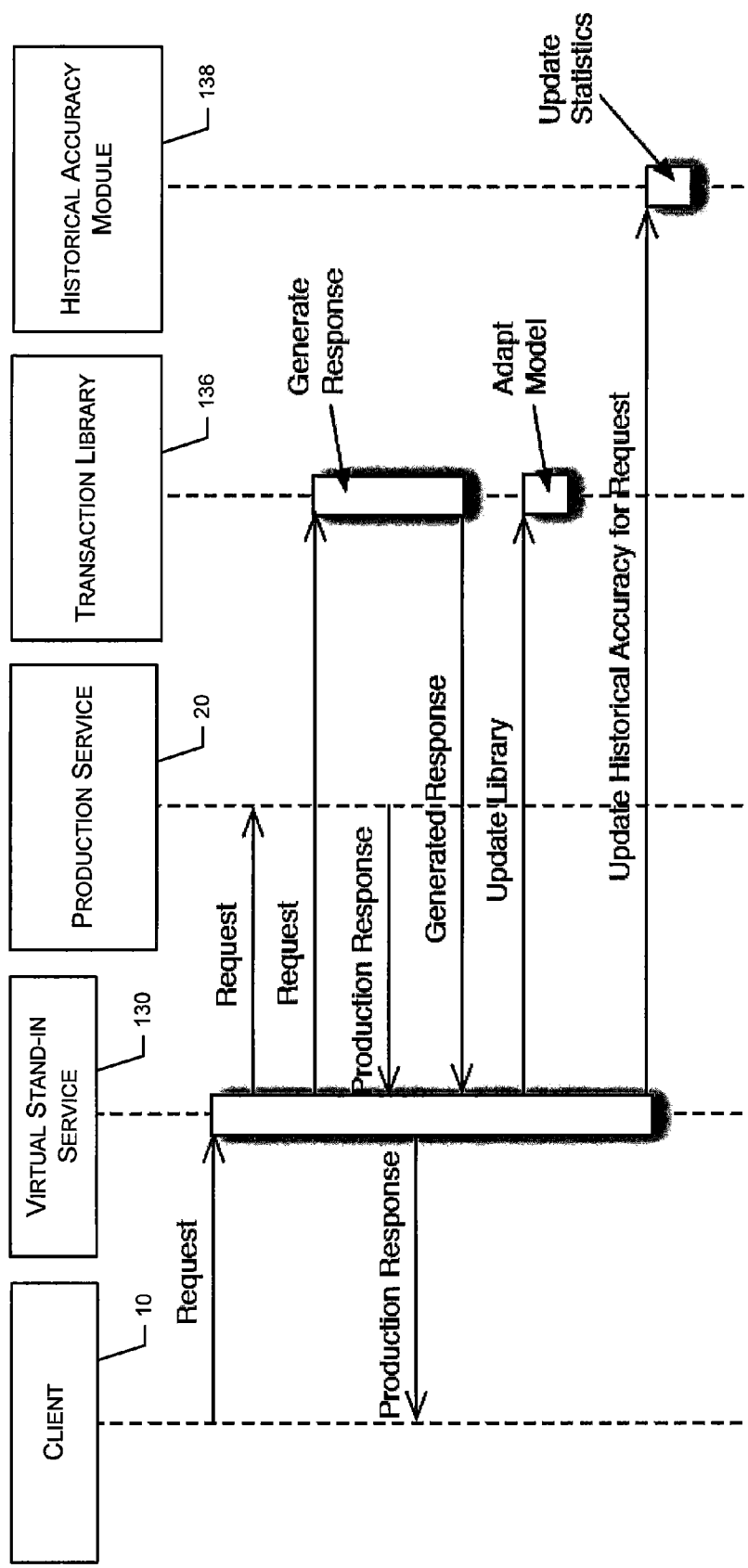
FIG. 5 is a block diagram illustrating operations in a learning mode corresponding to some embodiments of the present inventive subject matter.
Figure 6:
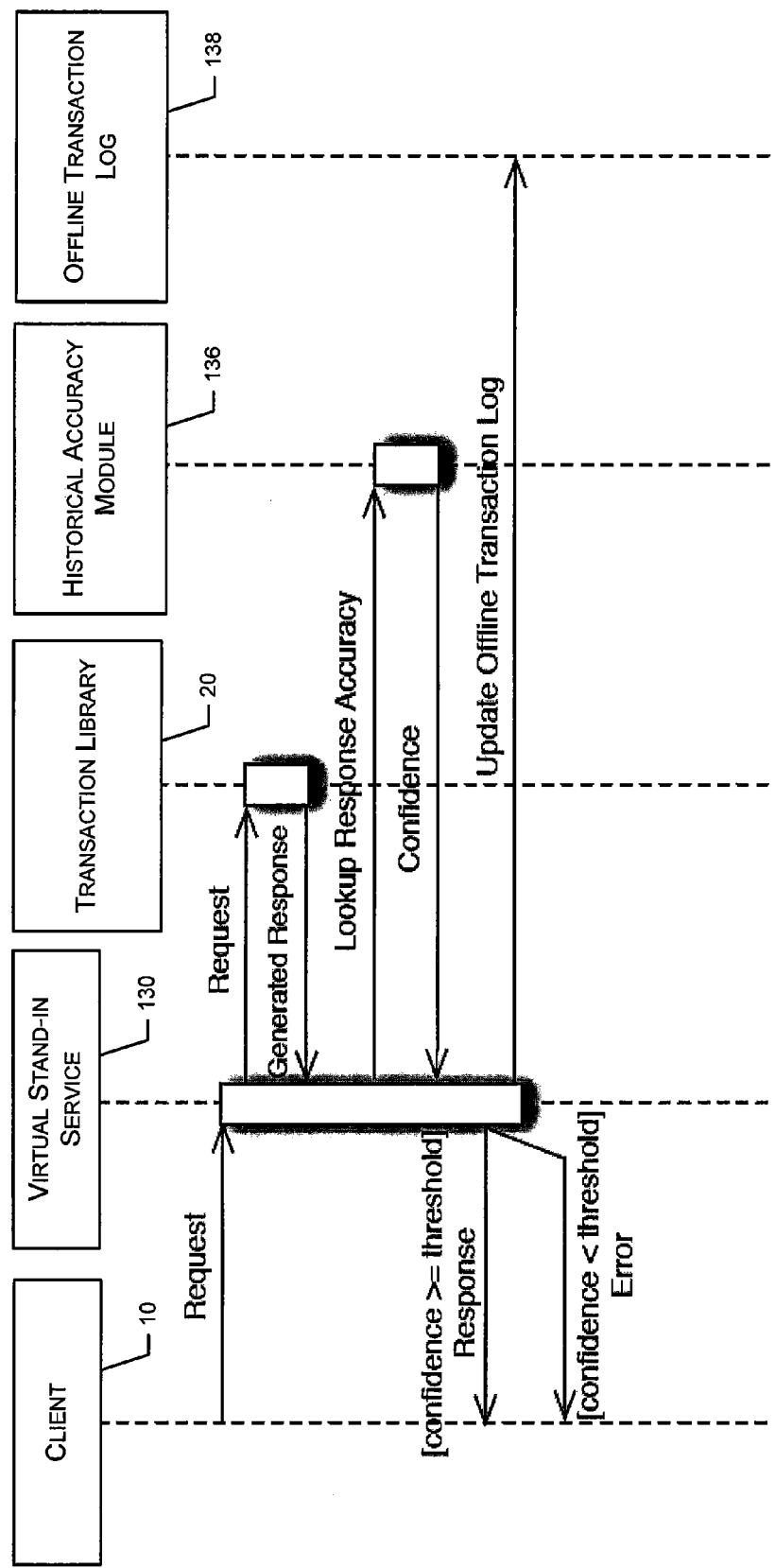
FIG. 6 is a block diagram illustrating operations in a stand-in mode corresponding to some embodiments of the present inventive subject matter.

Detailed operations corresponding to each of the different operating modes are discussed below regarding FIGS. 5-7. For example, reference is now made to FIG. 5, which is a block diagram illustrating operations in a learning mode corresponding to some embodiments of the present inventive subject matter. In learning mode, the production computing service 20 is online/available and the virtual stand-in computing service 130 records all transactions (requests and responses) processed by the production computing service 20. The virtual stand-in computing service 130 uses these transactions to incrementally and adaptively learn the behavior of the production computing service 20. In this manner, a production computing service model may be generated.

Some embodiments provide that all requests from clients 10 are serviced by the production computing service 20. These transactions may be logged in the transaction library 136, which may include a database or other type data repository. The stored data may include the requests sent by the client 10 and the associated response(s) returned by the production computing service 20. The virtual stand-in computing service 130 may be running in parallel with the production computing service 20 and may also attempt to answer requests sent by the client 20. The virtual stand-in computing service 130 may search for a matching request in the transaction library 136 and may generate a model-generated response to the request. In learning mode, the model-generated response is not sent to the client 20 and instead may be compared to the production computing service response. If the model-generated response differs from the production computing service response then the production computing service model of the virtual stand-in computing service 130 may be updated/adapted. In this manner, the virtual stand-in computing service 130 may adaptively learn the behavior of the production computing service 20.

Some embodiments provide that statistics may be calculated to keep track of the accuracy of the virtual service responses for different types of requests. In some embodiments, this statistical information can be used in stand-in mode to estimate confidence.

In some embodiments, the virtual stand-in computing service 130 is configured to intercept the transaction traffic between the client 10 and the production computing service 20. Some embodiments provide that the virtual stand-in computing service 130 may receive a request from client 10 that is seeking a service from a production computing service 20. The virtual stand-in computing service 130 may forward the request from the client 10 to the production computing service 20. The production computing service 20 may send a production computing service response back to the virtual stand-in computing service 130, which may send the production computing service response to the client 10. Additionally, the virtual stand-in computing service 130 may send the request from the client 10 to the transaction library 136. The transaction library 136 may generate a model-generated response, which may be compared with the production response generated by the production computing service 20. The transaction library 136 may be updated with the results of the comparison so that the production computing service model may be adapted. The historical accuracy module 138 may receive and maintain accuracy information corresponding to different requests and/or request types. Statistics corresponding to the accuracy of the generated responses to actual requests and/or request types may be generated and updated as additional accuracy data is received.

The virtual stand-in computing service 130 may continue to receive requests from clients 10 when the production computing service 20 becomes unavailable. Reference is now made to FIG. 6, which is a block diagram illustrating operations in a stand-in mode corresponding to some embodiments of the present inventive subject matter. As described above, when the production computing service 20 goes offline or becomes otherwise unavailable, the virtual stand-in computing service 130 switches into stand-in mode in which the virtual stand-in computing service 130 stands in for the production computing service. The virtual stand-in computing service 130 may send back model-generated responses to requests made by clients 10. In some embodiments, requests received and responses returned may be recorded in the offline transaction log 134.

For incoming requests from the client 10, the virtual stand-in computing service 130 searches the transaction library 136 to generate a model response (or series of responses). The virtual stand-in computing service 130 estimates the confidence it has in the response by looking up the historical accuracy (based on statistics calculated during learning mode) for the given request type. In some embodiments, the virtual stand-in computing service 130 may include a predefined and/or configurable confidence threshold. If the confidence in the model-generated response is greater than or equal to the confidence threshold, then the virtual stand-in computing service 130 may send the model-generated response to the client 20. If the confidence is less than the confidence threshold an error message may be sent to the client 20. The virtual stand-in computing service 130 may also have a predefined list of request types which are "low risk" (unlikely to cause a problem if an inaccurate response is returned). Low risk requests may have a lower confidence threshold on which to decide whether or not to return a model-generated response or an error. Conversely, the virtual stand-in computing service may also have a list of request types which are "high risk" and which have a higher confidence threshold. The high risk confidence threshold may be set such that the virtual stand-in computing service always sends an error for such high risk request types.

Some embodiments provide that the production computing service 20 may become unavailable because it is off-line, nonfunctional and/or nonresponsive to requests from clients 10. In some embodiments, the virtual stand-in computing service 130 may determine that the production computing service 20 is unavailable based on receipt of an error message from the production computing service 20, a lack of response from the production computing service 20 and/or a significantly delayed response from the production computing service 20. In some embodiments, the production computing service 20 may notify the virtual stand-in computing service 130 in advance of known and/or planned periods of unavailability.

The virtual stand-in computing service 130 may use the historical accuracy module 138 to determine them model-generated response accuracy, which may be received as confidence data. Some embodiments provide that the confidence data may include a confidence value such as, for example, a numerical value and/or a confidence classification, such as, for example, "High", "Medium" or "Low", among others.

In the event the confidence data satisfies the confidence threshold, the virtual stand-in computing service 130 may update and offline transaction log 134. In some embodiments, the offline transaction log 134 may maintain relevant data corresponding to requests from clients 10 that were served by model-generated responses via the virtual stand-in computing service 130. Relevant data may include the request content, request type, requesting client information, request time and date, and/or the model-generated response, among others. In this matter, accurate record of transactions (e.g., requests/responses) during the period of production computing service unavailability may be preserved.

In some embodiments, the confidence threshold may be request type specific. For example, requests corresponding to low risk, low liability and/or non-critical operations may have lower confidence thresholds than requests corresponding to high risk, high liability and/or critical operations. Some embodiments provide that a confidence threshold may be a function of one or more variables within a request type. For example, if the request type corresponds to a monetary transaction having a value of less than a specific amount, the confidence threshold may be lower than the request type for a monetary transaction having a value greater than the specific amount.

In some embodiments, the confidence threshold may be a function of elapsed time since the production computing service became unavailable. For example, a request for more time sensitive information may be associated with a confidence threshold that increases as a function of time so that responses must have increasingly higher confidence data to meet the confidence threshold, and thus be sent to the client 10. For example, some embodiments provide that the confidence threshold may be determined algorithmically and may use one or more input variables. In this manner, the virtual stand-in computing service 130 may be able to determine which requests it is capable of responding to during production computing service unavailability.

Figure 7:
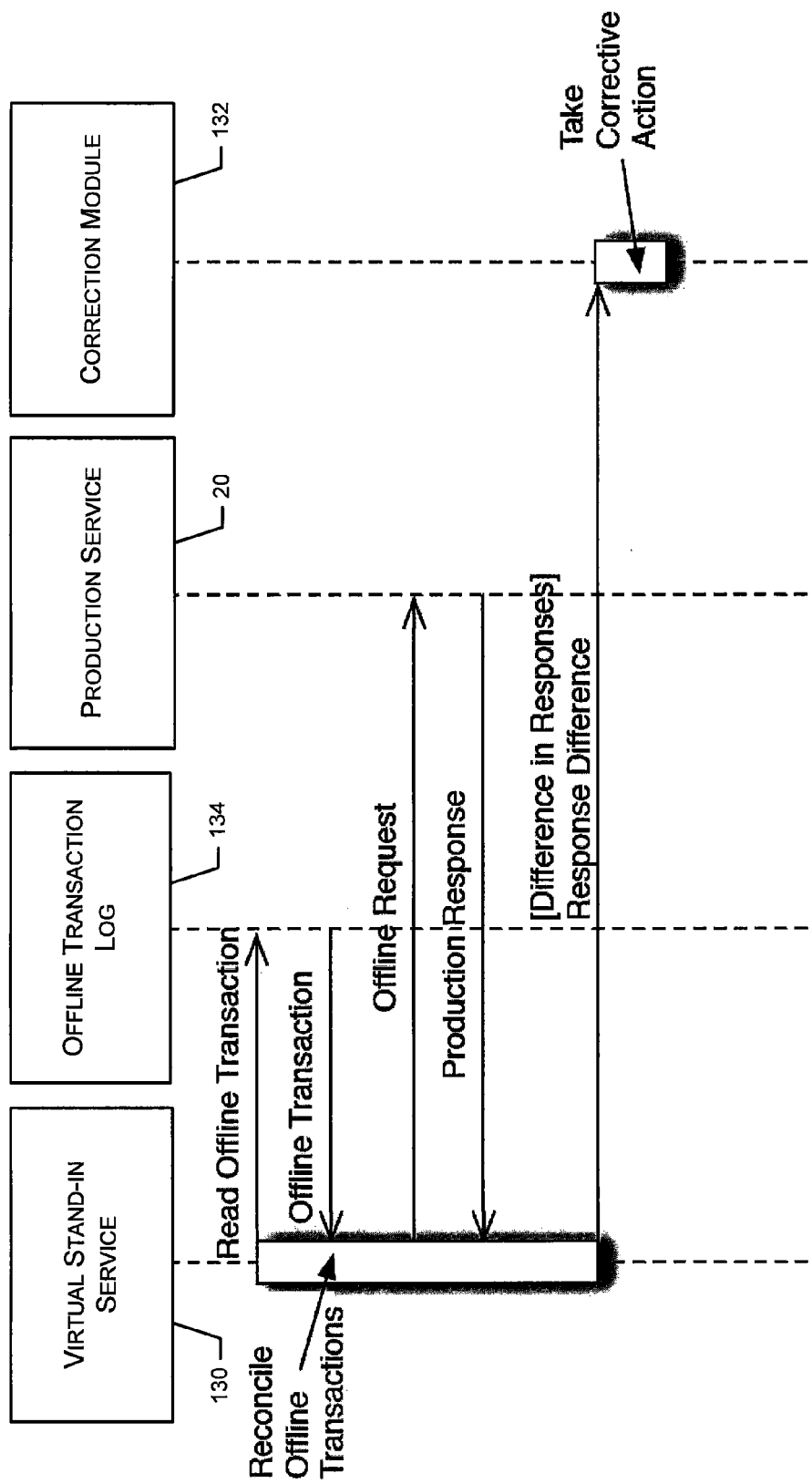
FIG. 7 is a block diagram illustrating operations in a reconciliation mode corresponding to some embodiments of the present inventive subject matter.

Reference is now made to FIG. 7, which is a block diagram illustrating operations in a reconciliation mode corresponding to some embodiments of the present inventive subject matter. When the production computing service 20 comes back online or becomes otherwise available to service requests, the requests recorded in the offline transaction log 134 database are sent to the production computing service 20. In cases where the production computing service 20 returns a different response than that sent by the virtual stand-in computing service 130, the difference in responses may be sent to a correction module 132, which may take and/or cause corrective action to be taken. After all offline transactions have been reconciled, the virtual stand-in computing service transitions back to learning mode.

In more detail, when the production computing service 20 becomes available again, all requests handled by the virtual stand-in computing service 130 during stand-in mode are sent to the production computing service 20, to bring the production computing service 20 up to date. The responses produced by the production computing service 20 are compared to those sent by the virtual stand-in computing service 130. If the responses differ, the virtual stand-in computing service may activate a correction module 132. The correction module 132 is responsible for taking corrective action for any incorrect model-generated responses sent by the virtual stand-in computing service 130. The implementation of the correction module 132 may be highly dependent on the specific client system and the service being virtualized. Once all offline transactions have been processed by the production computing service 20, the virtual stand-in computing service 130 resumes learning mode.

Figure 8:
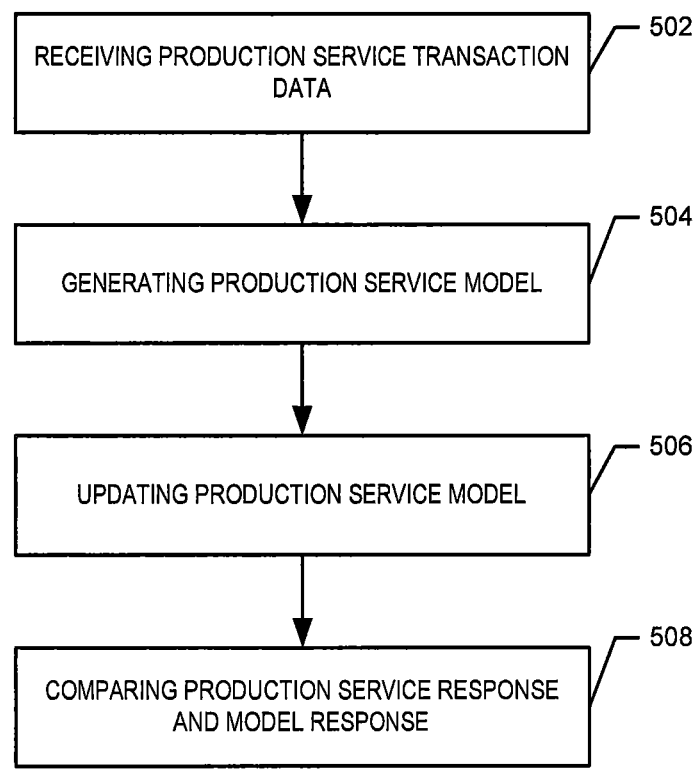
FIG. 8 is a flowchart illustrating operations for systems/methods according to some embodiments of the present inventive subject matter.

Reference is now made to FIG. 8, which is a flowchart illustrating operations for systems/methods according to some embodiments of the present inventive subject matter. Operations include receiving, by an active virtual service, transaction data corresponding to a production computing service (block 502). In some embodiments, the transaction data includes requests received from clients of the production computing service. The received requests may be transmitted to the production computing service. The transaction data may include responses to the requests that are received from the production computing service. The production computing service responses may be transmitted to the client.

A production computing service model may be generated based on the transaction data (block 504). In some embodiments, the production computing service model may include requests, request types, production computing service responses, and/or confidence data that corresponds to the requests and/or request types. For example, requests received from clients and production computing service responses corresponding to the requests may be sent to a transaction library. The requests and respective production computing service responses may be associated with one another in the transaction library. Some embodiments provide that model responses are generated corresponding to the request based on transaction library data. In some embodiments, the production computing service model may be updated based on additional transaction data corresponding to the production computing service (block 506).

In some embodiments, the production computing service response is compared to the model response generate an accuracy of the model response (block 508). The production computing service model may be updated responsive to results of the comparison. In this manner, the production computing service model may be adaptively generated. Some embodiments provide that historical accuracy values corresponding to different request types may be generated and updated as the production computing service model is updated.

Figure 9:
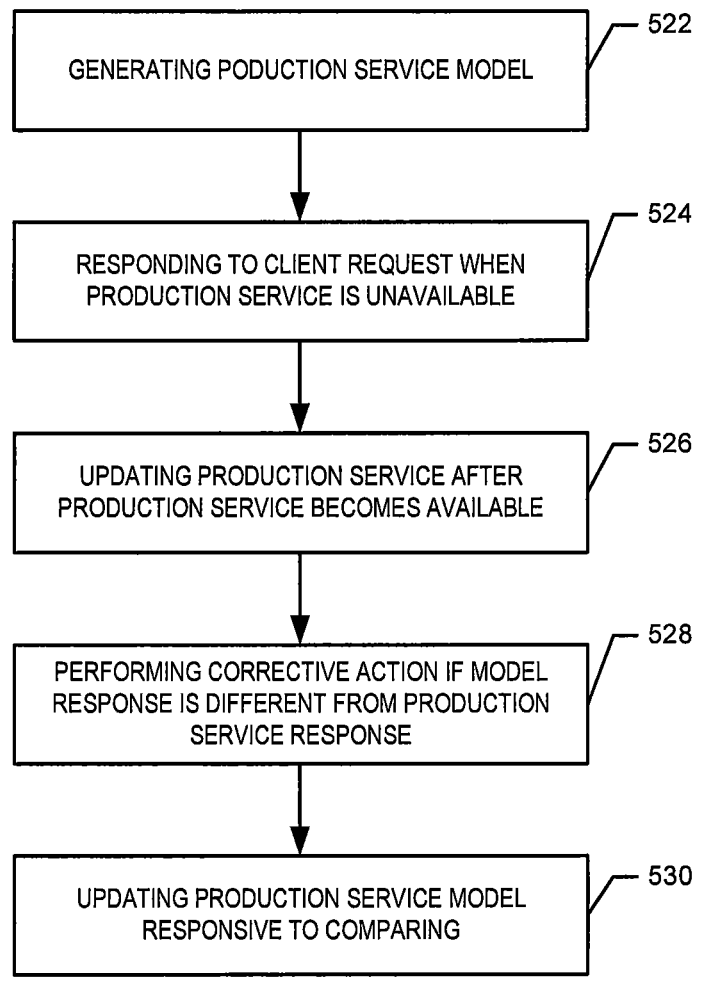
FIG. 9 is a flowchart illustrating operations for systems/methods according to embodiments of the present inventive subject matter.

Reference is now made to FIG. 9, which is a flowchart illustrating operations for systems/methods according to embodiments of the present inventive subject matter. Operations may include generating a production computing service model that include request types and confidence values that correspond to the different request types (block 522). In some embodiments, generating the production computing service model may correspond to a learning mode of a virtual stand-in computing service as described herein. The production computing service model may be based on transaction data corresponding to a production computing service and may be collected while the production computing service is available and/or on-line. Some embodiments provide that the transaction data includes requests from clients for service from the production computing service and the corresponding responses provided by the production computing service. A transaction library may be populated with the requests, the corresponding responses and confidence values corresponding to specific requests and/or request types.

During periods of unavailability of the production computing service, some embodiments include responding to a request received from a client of the production computing service with a model-generated response to the request (block 524). In some embodiments, responding to a request with a model-generated response may correspond to a stand-in mode of a virtual stand-in computing service as described herein. In some embodiments, an initial model-generated response corresponding to the request and based on data in the transaction library may be generated. Accuracy data corresponding to the response based on a corresponding request type and historical accuracy data of the corresponding request type may be generated. The accuracy data may be compared to confidence threshold data. In some embodiments, the model-generated response includes the initial model-generated response if the accuracy data is equal to or greater than the confidence threshold data. Some embodiments provide that the model-generated response includes an error message if the initial model-generated response is less than the confidence threshold data.

In some embodiments, the confidence threshold data includes a confidence threshold value that corresponds to a request type. Responding to the request received from the client with the model-generated response may include updating an offline transaction log that is configured to maintain a record of transaction data when the production computing service is unavailable. Some embodiments provide that the offline transaction log is updated when the client is sent the initial model-generated response instead of an error message. Some embodiments provide that the record of transaction data may include the request received and the model-generated response. Other data may be included in the record of transaction data including client identifier information, and/or time/date data, among others.

Some embodiments provide that the confidence threshold data is configurable. In some embodiments, the confidence threshold data may be a function of the elapsed time since the production computing service became unavailable or offline. For example, different request types may corresponding to responses with more or less dynamic data. In the case of data that may be more dynamic, the validity of the data may erode quickly relative to more stable, less dynamic data. In this manner, the confidence threshold may be configured to increase with elapsed time, requiring increasingly higher confidence levels for corresponding model-generated responses to be sent to the client.

Some embodiments provide that the confidence threshold data may be a function a value of a service or good corresponding to the request. For example, a request for a monetary transaction may trigger different confidence thresholds depending on the value of the monetary transaction. An example request may include a request to withdraw cash and the confidence threshold may be substantially higher if the withdrawal amount exceeds $100.

In some embodiments, the confidence threshold may be a function of whether the request causes a read operation or a write operation. For example, requests that may result in a write operation may have a generally lower confidence threshold as compared to requests causing a read or a read/write operation. For example, a request corresponding to a user setting up an account may generally result in write operations and may have a relatively low confidence threshold. As such, the confidence level corresponding to such a model-generated response may be lower and still meet r exceed the confidence threshold.

The production computing service may be updated with the request received from the client and the model-generated response responsive once the production computing service becomes available after being unavailable (block 526). In some embodiments, updating the production computing service may correspond to a reconciliation mode of a virtual stand-in computing service as described herein. Some embodiments provide that updating the production computing service includes sending requests that are made while the production computing service is unavailable to the production computing service. The production computing service may generate a response to the request, which may be compared to the model-generated response to determine a difference therebetween. A corrective action may be performed if the model-generated response is different from the response received by the production computing service (block 528). In some embodiments, the corrective action includes notifying the client of the difference in response and/or updating a transaction library that includes the transaction data. The updated transaction data in the transaction library may be used to update the production computing service model by storing subsequently received transaction data and estimating updated confidence values corresponding to requests and/or request types.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Some embodiments provide that one or more of the programs may be executed during a portion of execution of another one of the programs in the corresponding process operation.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:

receiving, by an active virtual service, a request from a client of a production computing service and transmitting the request to the production computing service;

receiving, by the active virtual service, a response to the request from the production computing service and transmitting the response to the request to the client;

generating, by the active virtual service and based on the request and the response, a production computing service model that includes a plurality of request types and confidence data that corresponds to at least one model-generated response generated for each of the plurality of request types, resulting in a plurality of model-generated responses;

responding, by the active virtual service and in response to the production computing service being unavailable, to a second received request with one of the model-generated responses, wherein the one of the model-generated responses is selected based on the request type and whether the confidence data satisfies a confidence threshold, wherein the confidence data is calculated based on one or more variables based on the request type; and updating the production computing service model based on transaction data from the production computing service corresponding to the second received request, wherein updating the production computing service model comprises updating at least one of the plurality of model-generated responses and updating the confidence data that corresponds to at least one of the plurality of request types, wherein receiving the request, receiving the response, generating the production computing service model, responding to the second received request, and updating the production computing service model are performed using a processor.

2. The method according to claim 1, wherein generating the production computing service model comprises:
sending the request to a transaction library;
sending the response to the request to the transaction library; and
associating the request and the response to the request in the transaction library.

3. The method according to claim 1, wherein generating the production computing service model comprises:
associating the request and the response in a transaction library; and
generating a model response to the request based on transaction library data.

4. The method according to claim 3, further comprising:
comparing the response to the request from the production computing service with the model response to generate an accuracy of the model response; and
updating the production computing service model responsive to results of the comparing operation.

5. The method according to claim 1, further comprising generating historical accuracy values corresponding to the plurality of request types,
wherein updating the production computing service model comprises updating the historical accuracy values.

6. A computer program product comprising:
a computer readable storage medium having computer readable code embodied therein, the computer readable code comprising:
computer readable code to receive a request from a client of a production computing service and transmit the request to the production computing service;
computer readable code to receive a response to the request from the production computing service and transmit the response to the request to the client;
computer readable code to generate, based on the request and the response, a production computing service model that includes a plurality of request types and confidence data corresponding to at least one model-generated response generated for each of the plurality of request types, resulting in a plurality of model-generated responses;
computer readable code to respond, in response to the production computing service being unavailable, to a second received request with one of the model-generated responses, wherein the one of the model-generated response is selected based on the request type and whether the confidence date satisfies a confidence threshold, wherein the confidence data is calculated based on one or more variables based on the request type; and
computer readable code to update the production computing service model based on transaction data from the production computing service corresponding to the second received request, wherein the computer readable code to update the production computing service model comprises computer readable code to update at least one of the plurality of model-generated responses and computer readable code to update the confidence data that corresponds to at least one of the plurality of request types.

7. The computer program product according, to claim 6, wherein the computer readable code to generate the production computing service model comprises:
computer readable code to send the request to a transaction library;
computer readable code to send the response to the request to the transaction library; and
computer readable code to associate the request and the response to the request in the transaction library.

8. The computer program product according to claim 6, wherein the computer readable code to generate the production computing service model comprises:
computer readable code to associate the request and the response in a transaction library; and
computer readable code to generate a model response to the request based on transaction library data.

9. The computer program product according to claim 8, further comprising:
computer readable code to compare the response to the request from the production computing service with the model response to generate an accuracy of the model response; and
computer readable code to update the production computing service model responsive to results of the comparing operation.

10. The computer program product according to claim 6, further comprising computer readable code to generate historical accuracy values corresponding to the plurality of request types, wherein the computer readable code to update the production computing service model comprises computer readable code to update the historical accuracy values.

11. A computer system, comprising:
a processor; and
a memory coupled to the processor, the memory comprising computer readable program code embodied therein that, when executed by the processor, causes the processor to:
receive a request from a client of a production computing service and transmit the request to the production computing service;
receive a response to the request from the production computing service and transmit the response to the request to the client;
generate, based on the request and the response, a production computing service model that includes a plurality of request types and confidence data corresponding to at least one model-generated response generated for each of the plurality of request types, resulting in a plurality of model-generated responses;

respond, in response to the production computing service being unavailable, to a second received with one of the model-generated responses, wherein the one of the model-generated responses is selected based on the request type and whether the confidence data satisfies a confidence threshold, wherein the confidence data is calculated based on one or more variables based on the request type; and update the production computing service model based on transaction data from the production computing service corresponding to the second received request, wherein the computer readable program code to update the production computing service model comprises computer readable program code to update at least the plurality of model-generated responses and computer readable program code to update the confidence data that corresponds to at least one of the plurality of request types.

12. The computer system according to claim 11, wherein the memory comprising the computer readable program code that, when executed by the processor, causes the processor to generate the production computing service model further comprises:

computer readable program code to send the request to a transaction library;

computer readable program code to send the response to the request to the transaction library; and computer readable program code to associate the request and the response to the request in the transaction library.

13. The computer system according to claim 11, wherein the memory comprising the computer readable program code that, when executed by the processor, causes the processor to generate the production computing service model comprises:

computer readable program code to associate the request and the response in a transaction library; and computer readable program code to generate a model response to the request based on transaction library data.

14. The computer system according to claim 13, wherein the memory comprises further computer readable program code that, when executed by the processor, causes the processor to:

compare the response to the request from the production computing service with the model response to generate an accuracy of the model response; and update the production computing service model responsive to results of the comparing operation.

15. The computer system according to claim 14, wherein the memory comprises further computer readable program code that, when executed by the processor, causes the processor to:

generate historical accuracy values corresponding to the plurality of request types, wherein the computer readable program code that, when executed by the processor, causes the processor to update the production computing service model comprises computer readable program code that, when executed by the processor, causes the processor to update the historical accuracy values.

* * * * *